Feb. 15, 1949.　　　　V. G. VAUGHAN　　　　2,461,904
THERMOSTATIC CONTROL
Filed March 21, 1946　　　　　　　　　　2 Sheets-Sheet 1

Victor G. Vaughan,
Inventor.
Haynes and Koenig
Attorneys.

Patented Feb. 15, 1949

2,461,904

UNITED STATES PATENT OFFICE 2,461,904

THERMOSTATIC CONTROL

Victor G. Vaughan, Attleboro, Mass., assignor to Metals & Controls Corporation, Attleboro, Mass., a corporation of Massachusetts Application March 21, 1946, Serial No. 655,979

22 Claims. (Cl. 175—320)

This invention relates to a thermostatic control and more particularly to a thermostatic control embodying means for compensating the operating differential between the opening and closing temperatures of a thermostat element therein, whereby a substantially straight-line temperature control is obtained.

This invention is an improvement upon that disclosed in the United States patent application of Edward F. Kurtz, Serial No. 599,808, filed June 16, 1945, for Thermostatic control.

Among the several objects of the invention are the provision of an improved thermostatic control for apparatus adapted to maintain a predetermined temperature in a given medium and which includes a thermostat responsive to temperature changes in said medium; the provision of an improved thermal motor which functions periodically to move said thermostat to an initiating position; and the provision of a thermostatic control system including the above-mentioned thermostat and thermal motor and a time-delay mechanism arranged to prevent operation of the temperature-maintaining apparatus if the thermostat is not at a temperature such as to demand operation thereof. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
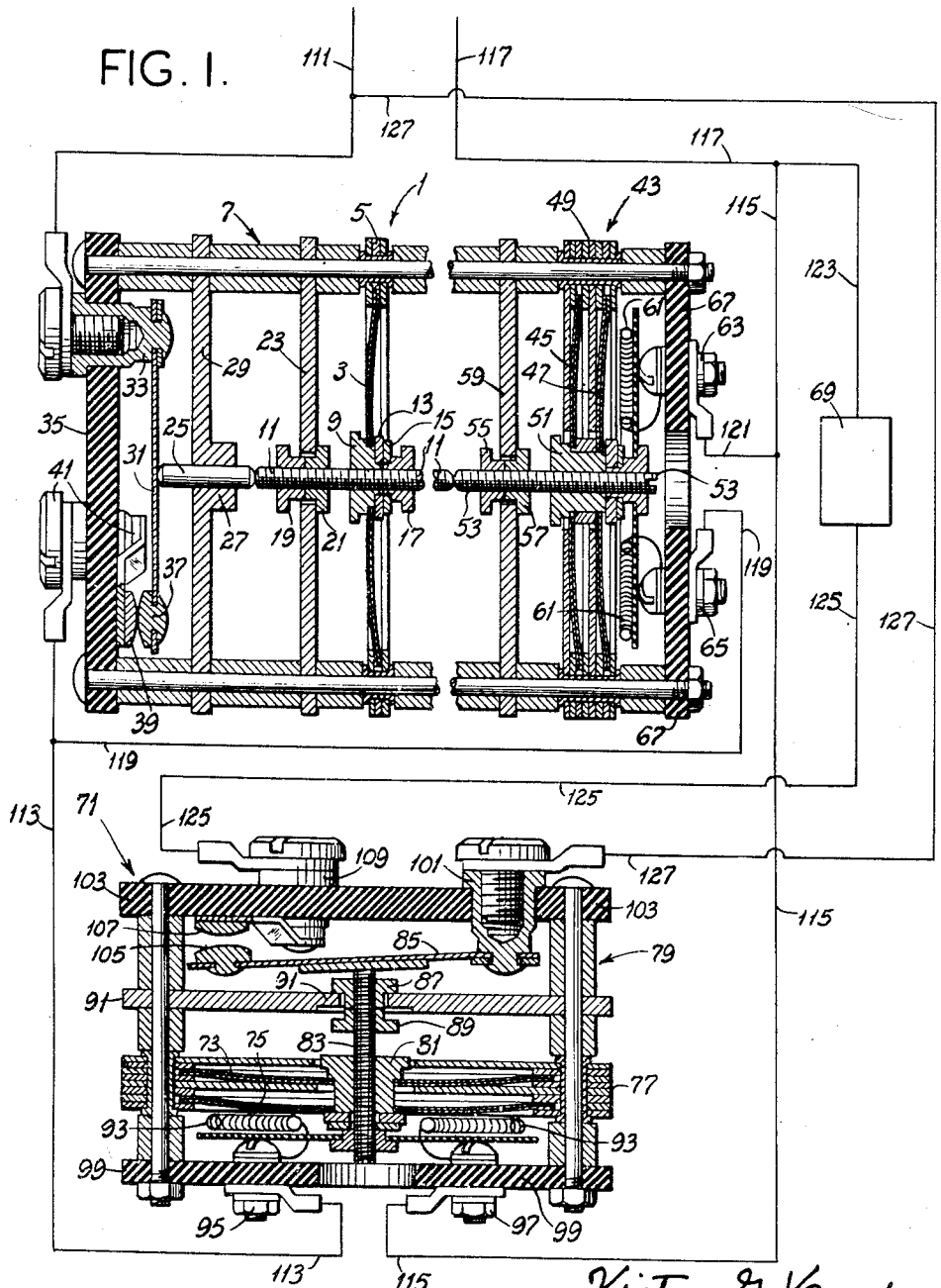
Figure 2:
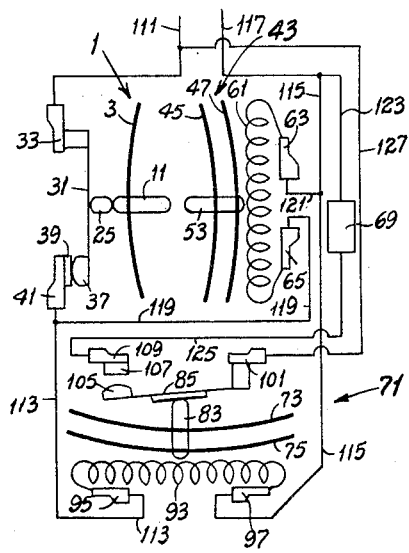
Figure 3:
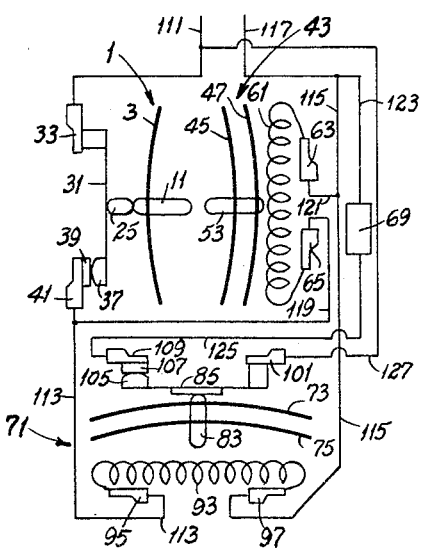
Figure 4:
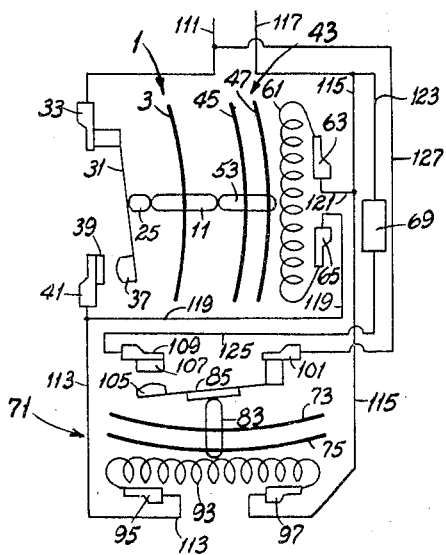

In the accompanying drawings, in which one of various possible embodiments of the invention is illustrated, Fig. 1 is a sectional view showing the thermostat, thermal motor and time-delay mechanism, and includes the connecting electrical circuit and apparatus associated therewith; and, Figs. 2, 3 and 4 are schematic diagrams illustrating different operating conditions of the control.

Similar reference characters indicate corresponding parts throughout the several views of the drawings.

The thermostatic control is herein illustrated as adapted to control heating apparatus so as to maintain a substantially constant air temperature in a given space, such as a room.

Referring to Fig. 1, the thermostatic control includes a thermostat 1 responsive to room temperature and shown as including a dished snap-acting thermostatic disc 3 which is inherently adapted to snap to the right when the temperature of the ambient air reaches a predetermined maximum and to snap to the left when said temperature falls below a predetermined minimum. The disc 3 is properly peripherally mounted in an annular ring 5 carried by suitable supporting structure, generally designated at 7. The disc has a central aperture to receive a hub 9 having a threaded bore receiving a threaded rod 11 which projects a substantial distance from each side of said disc. A washer 13 mounted on hub 9 abuts the inner periphery of disc 3, being held in position by a spring washer 15 and nut 17 threaded on rod 11. The throw of disc 3 is limited by a pair of nuts 19 and 21 threaded on rod 11 and having flanges adapted to abut a plate 23 suitably mounted in supporting structure 7.

A switch-actuating pin 25 is slidably mounted in a bushing 27 formed in a plate 29 suitably mounted in supporting structure 7. The left-hand end (as viewed in Fig. 1) of pin 25 abuts a spring contact arm 31 mounted at one end on a terminal post 33. Post 33 is mounted in an end plate 35. The bias of spring arm 31 is such as to maintain the right-hand end of pin 25 in engagement with rod 11. The free end of spring arm 31 carries a contact 37 adapted to engage a fixed contact 39 on end plate 35 when arm 31 is moved against its bias by pin 25. Fixed contact 39 is connected to a second terminal post 41 mounted in end plate 35. Contacts 37 and 39 are closed when thermostatic disc 3 snaps to the left and said contacts open when disc 3 snaps to the right.

The thermostatic disc 3 is adapted to be periodically snapped to the left by a thermal motor device generally designated by numeral 43. This thermal motor is of the type described in Wilson Patent No. 2,203,558 and generally comprises a pair of snap-acting thermostatic discs 45 and 47 properly peripherally mounted in an annular ring structure 49 carried by support 7. The discs 45 and 47 are provided with a central hub 51 which receives a threaded rod 53 projecting a substantial distance to the left of said discs and adapted to abut rod 11 of thermostat 1 to snap thermostatic disc 3 to the left when discs 45 and 47 snap to the left. The throw of discs 45 and 47 is limited by a pair of nuts 55 and 57 threaded on rod 53 having flanges adapted to abut plate 59 mounted in support 7. An electrical heating element 61 is positioned adjacent to disc 47, its ends being wired to terminals 63 and 65 on an end plate 67. Discs 45 and 47 are adapted to snap to the right when heated and to snap to the left upon cooling.

The above-described thermostatic control is connected in a circuit to control a heating apparatus 69 adapted to heat the room in which thermostat 1 is located. A time-delay mechanism, generally designated 71, is connected in said circuit if it is desired to prevent intermittent operation of the heating apparatus upon the periodic closure of contacts 37 and 39 by the action of thermal motor 43 on thermostat 1. This is so that said apparatus will not operate except when the thermostat 1 is actually calling for heat. The time-delay mechanism includes a thermostatic relay of the same general construction as thermal motor 43 and comprising a pair of snap-acting thermostatic discs 73 and 75 properly peripherally mounted in an annular ring structure 77 carried by a support generally indicated at 79. The discs 73 and 75 are provided with a central hub 81 which receives a threaded rod 83 extending upward from said discs into engagement with a spring contact arm 85 biased against said rod. The throw of discs 73 and 75 is limited by a pair of nuts 87 and 89 threaded on rod 83 having flanges adapted to abut plate 91 mounted in support 79. An electrical heating element 93 is positioned adjacent disc 75, its ends being wired to terminals 95 and 97 on an end plate 99. The spring contact arm is mounted at one end on a terminal post 101 in an end plate 103. The free end of the spring contact arm carries a contact 105 adapted to engage a fixed contact 107 on end plate 103 when arm 85 is moved against its bias by rod 83. Fixed contact 107 is connected to a second terminal post 109 mounted in end plate 103. Discs 73 and 75 are adapted to snap up when heated and to snap down upon cooling.

One lead 111 of a power supply is connected to terminal post 33. A lead 113 connects terminal post 41 and terminal post 95. A lead 115 connects terminal 97 and the other power supply lead 117. The heating element 61 of the thermal motor 43 is connected between leads 113 and 115 by lead 119 which is connected to terminal 65 and lead 121 which is connected to terminal 63. The heating apparatus 69 is connected in the circuit by a lead 123 to power supply lead 117 and lead 125 connected to terminal post 109. This circuit is completed by a lead 127 connected between terminal post 101 and power supply lead 111.

The operation of the thermostatic control assuming that it is to be used to control heating apparatus such as 69, is as follows:

The thermal motor 43 is so designed that its discs 45 and 47 heat more rapidly than the discs 73 and 75 of the thermostatic relay of the time-delay mechanism 71, and the discs 73 and 75 of the thermostatic relay cool more rapidly than the discs of the thermal motor. Assuming that the discs 45 and 47 have cooled down and snapped to the left, thereby snapping thermostatic disc 3 to the left, contacts 37 and 39 are closed. This closes a circuit from power lead 111 to terminal post 33, arm 31, contact 37, contact 39, terminal post 41, lead 113, terminal 95, heater element 93, terminal 97 and lead 115 to the other power lead 117. It also establishes flow of current from lead 113 through lead 119, terminal 65, heater element 61, terminal 63 and lead 121 to lead 115. Discs 45, 47, 73 and 75 are thereupon heated by their respective heating elements but since discs 45 and 47 heat more rapidly than discs 73 and 75, discs 45 and 47 snap to the right before discs 73 and 75 snap upward to close contacts 105 and 107. When discs 45 and 47 snap to the right they carry rod 53 to its right-hand limit, thereby enabling thermostatic disc 3 to snap to the right if its temperature is such (high enough) as to condition it for such movement.

Assume, however, that the room temperature is not sufficiently high to snap disc 3 to the right. It therefore remains to the left, as illustrated in Fig. 2, and contacts 37 and 39 remain closed. Current continues to flow through the heating element 93 and discs 73 and 75 become sufficiently heated to snap upward and close contacts 105 and 107, as illustrated in Fig. 3. This establishes a circuit through the heating apparatus traced as follows: from power lead 117 to lead 123, the heating apparatus 69, lead 125, terminal post 109, contact 107, contact 105, arm 85, terminal post 101, and lead 127 to the other power lead 111. This initiates operation of the heating apparatus and it continues to operate and supply heat to the room until the room temperature is raised to the point at which thermostatic disc 3 snaps to the right to open contacts 37 and 39. When these contacts open, both heating elements 61 and 93 are deenergized. Discs 73 and 75 cool more rapidly than discs 45 and 47 and snap down to open contacts 105 and 107, thereby breaking the heating apparatus circuit and stopping the operation thereof. Ultimately, discs 45 and 47 cool to the point at which they snap to the left, thereby placing the parts in their initial positions ready for repetition of the cycle described above.

A second condition which may occur after discs 45 and 47 have been heated and snapped to the right, releasing thermostatic disc 3 so that this disc may promptly snap to the right, exists when the room temperature is sufficiently high for the purpose. If this condition exists, all three discs, 3, 45 and 47 snap to the right, and contacts 37 and 39 are immediately opened. This condition is illustrated in Fig. 4. The heating element circuits are immediately broken and heating elements 61 and 93 and the discs associated therewith start to cool at once. When discs 45 and 47 have cooled sufficiently they snap to the left, thereby resetting the device for repetition of the cycle. Under this condition, although the contacts 37 and 39 are closed for a short interval, they are not closed for a sufficient period to permit heating element 93 to heat discs 73 and 75 to snap upward. Thus contacts 105 and 107 are not closed to start the heating apparatus. This is because discs 73 and 75 are heated more slowly than discs 45 and 47. Consequently, the heating apparatus does not start each time contacts 37 and 39 are closed, but only when the thermostat 1 calls for heat.

The thermal motor device 43 functions periodically to snap the disc 3 to the left and close contacts 37 and 39 only when the temperature of disc 3 is at or above the value at which disc 3 snaps to the right, i. e., when the room temperature is at or above standard. When the room temperature is below standard, disc 3 remains snapped to the left and contacts 37 and 39 remain closed to energize heating element 61 continuously so that discs 45 and 47 remain snapped to the right until the heating apparatus 69 has supplied sufficient heat to bring the room to standard temperature. This latter condition is apparent from Fig. 3. This means that, unlike the construction of said application, the motor life is conserved since the discs 45 and 47 will be cyclic only so long as room temperature is at or above standard.

The thermostatic control of this invention functions to compensate the operating differential of the thermostatic disc 3 in the following manner. Assume that disc 3 is so designed and set that it snaps to the right upon heating to 72° F. and snaps back to the left on cooling to 70° F. If the disc is at 72° F. it will normally assume its right-hand position. If it is snapped to the left by the external force applied thereto by the thermal motor device 43 and is then released, it will snap back to the right. On the other hand, if disc 3 is at 71.9° F. for example, and is then snapped to the left by the thermal motor device, it will remain snapped to the left even though released, since it is not at a temperature high enough to snap back to the right. Thus contacts 37 and 39 remain closed and the heating apparatus will operate until the room temperature has risen 0.1° F., whereupon disc 3, being heated to 72° F. (its snapping temperature), snaps to the right, opens contacts 37 and 39, deenergizes heating element 93. This opens the heating apparatus circuit to stop operation thereof. If disc 3, when at 71.9° F., were not snapped to the left by the external force applied by the thermal motor, it would not snap to the left at all until the room temperature had dropped below 70° F., the cold snapping temperature of the disc. The provision of the thermal motor device for periodically snapping disc 3 to the left thus substantially eliminates the lag in operation due to the differential between the hot and cold snapping temperatures of the disc. A more substantially constant room temperature is thus assured.

The time-delay mechanism 71 may be omitted if intermittent operation of the heating apparatus upon the intermittent closure of contacts 37 and 39 is not undesirable. In such case, the heating apparatus 69 may be connected into the power circuit through the switch formed by arm 31 and contacts 37 and 39.

Other types of thermostatic elements having inherent temperature differential may be substituted for the dished snap-acting thermostatic disc herein illustrated. Since other suitable types are known in the art, further description is deemed to be unnecessary.

If the thermostatic control is used to control a cooling apparatus it will be clear to those skilled in the art that disc 3 will have its temperature operating characteristics reversed.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A thermostatic control comprising contacts in a circuit, a temperature-responsive device adapted to move to one position to close said contacts upon temperature change in one direction and to move to a second position to open said contacts upon temperature change in the other direction, and a thermal motor adapted periodically to urge said device to said first position.

2. A thermostatic control comprising contacts in a circuit, a temperature-responsive device adapted to move to one position to close said contacts upon temperature change in one direction and to move to a second position to open said contacts upon temperature change in the other direction, and a thermal motor adapted periodically to apply an external force to said device to urge it to said first position and releasing said force to permit said device to move to said second position.

3. A thermostatic control comprising contacts adapted to make and break a circuit, an inherently snap-acting temperature-responsive device adapted to snap to one position to close said contacts upon temperature change in one direction and to move to a second position to open said contacts upon temperature change in the other direction, and a thermal motor adapted periodically to apply an external force to said device to urge it to said first position and releasing said force to permit said device to move to said second position.

4. A thermostatic control comprising normally biased open contacts adapted to make and break a circuit, an inherently snap-acting temperature-responsive device adapted to snap to one position to close said contacts against said bias upon temperature change in one direction and to move to a second position to open said contacts upon temperature change in the other direction, and a thermal motor adapted periodically to apply an external force to said device to urge it to said first position and releasing said force to permit said device to move to said second position.

5. A thermostatic control comprising normally open contacts adapted to make and break a circuit, an inherently snap-acting temperature-responsive device adapted to snap to one position upon temperature change in one direction to close said contacts and to snap to a second position upon temperature change in the other direction to permit said contacts to open, and a thermal motor for periodically applying an external force to said device to urge said device to said first position and for periodically releasing said force to permit said device to snap to said second position, said thermal motor including a heating element adapted to be energized upon closure of said contacts and deenergized upon opening thereof.

6. A thermostatic control comprising normally open contacts adapted to make and break a circuit, an inherently snap-acting temperature-responsive device adapted to snap to one position upon temperature change in one direction to close said contacts and to snap to a second position upon temperature change in the other direction to permit said contacts to open, and a thermal motor for periodically applying an external force to said device to urge said device to said first position and for periodically releasing said force to permit said device to snap to said second position, said thermal motor comprising snap-acting thermostatic means adapted to snap to one position to apply said force upon cooling and to snap to a second position wherein said force is released upon heating, and a heating element for said thermal motor adapted to be energized upon closure of said contacts and deenergized upon opening thereof.

7. A thermostatic control comprising contacts adapted to make and break a circuit, an inherently snap-acting temperature-responsive device adapted to snap to one position on temperature change in one direction to close said contacts and to snap to a second position on temperature change in the other direction to permit said contacts to open, and means operative only when said device is at or beyond the temperature at which it snaps to said second position for periodically applying an external force to said device to urge said device to said first position and for periodically releasing said force to permit said device to snap to said second position.

8. A thermostatic control comprising normally open contacts adapted to make and break a circuit, an inherently snap-acting temperature-responsive device adapted to snap to one position on temperature change in one direction to close said contacts and to snap to a second position on temperature change in the other direction to permit said contacts to open, and means operative only when said device is at or beyond the temperature at which it snaps to said second position for periodically applying an external force to said device to urge said device to said first position and for periodically releasing said force to permit said device to snap to said second position, said means comprising a thermal motor.

9. A thermostatic control comprising normally open contacts adapted to make and break a circuit, an inherently snap-acting temperature-responsive device adapted to snap to one position on temperature change in one direction to close said contacts and to snap to a second position on temperature change in the other direction to permit said contacts to open, and means operative only when said device is at or beyond the temperature at which it snaps to said second position for periodically applying an external force to said device to urge said device to said first position and for periodically releasing said force to permit said device to snap to said second position, said means comprising a thermal motor including a heating element adapted to be energize upon closure of said contacts and deenergized upon opening thereof.

10. A thermostatic control comprising normally open contacts adapted to make and break a circuit, an inherently snap-acting temperature-responsive device adapted to snap to one position on temperature change in one direction to close said contacts and to snap to a second position on temperature change in the other direction to permit said contacts to open, and means operative only when said device is at or beyond the temperature at which it snaps to said second position for periodically applying an external force to said device to urge said device to said first position and for periodically releasing said force to permit said device to snap to said second position, said means comprising a thermal motor including snap-acting thermostatic means adapted to snap to one position to apply said force upon cooling and to snap to a second position wherein said force is released upon heating, and a heating element adapted to be energized upon closure of said contacts and deenergized upon opening thereof.

11. A thermostatic control comprising normally open contacts adapted to make and break a circuit, an inherently snap-acting temperature-responsive device adapted to snap to one position on temperature change in one direction to close said contacts and to snap to a second position on temperature change in the other direction to permit said contacts to open, a thermal motor for periodically applying an external force to said device upon cooling to urge said device to said first position and for periodically releasing said force upon heating to permit said device to snap to said second position, and a time-delay means responsive to closure of said contacts, said thermal motor having predetermined heating and cooling periods, said time-delay means having a time-delay period greater than the heating period of said motor and a reset period less than the cooling period of the motor.

12. A thermostatic control for apparatus adapted to maintain a predetermined temperature in a medium comprising a circuit for said apparatus, normally open contacts in said circuit adapted to make and break said circuit, an inherently snap-acting thermostat responsive to temperature of said medium adapted to snap to one position on temperature change in one direction to close said contacts and complete the circuit through said apparatus and to snap to a second position on temperature change in the other direction to permit said contacts to open and break said circuit, and a thermal motor for periodically applying an external force to said thermostat to urge said thermostat to said first position and for periodically releasing said force to permit said thermostat to snap to said second position.

13. A thermostatic control for apparatus adapted to maintain a predetermined temperature in a medium comprising a circuit for said apparatus, a control circuit, normally open contacts in said control circuit adapted to make and break said control circuit, an inherently snap-acting thermostat responsive to temperature of said medium adapted to snap to one position on temperature change in one direction to close said contacts and complete the control circuit and to snap to a second position on temperature change in the other direction to permit said contacts to open and break said control circuit, a thermal motor for periodically applying an external force to said thermostat upon cooling to urge said thermostat to said first position and for periodically releasing said force upon heating to permit said thermostat to snap to said second position, and a time-delay switch in said apparatus circuit responsive to closure of said contacts for preventing completion of the apparatus circuit except when the contacts are closed for a substantial time, said thermal motor having predetermined heating and cooling periods, said time-delay switch having a time-delay period greater than the heating period of said motor and a reset period less than the cooling period of the motor.

14. A thermostatic control comprising a dished snap-acting thermostatic disc adapted to snap from a first configuration to another upon change in temperature thereof above a predetermined limit and to snap back to its first configuration upon change in temperature below a lower predetermined limit, and means operative only when said disc is at or above its upper temperature limit to urge said disc into its said first configuration.

15. A thermostatic control comparing an inherently snap-acting temperature-responsive device adapted to snap from a first position to a second position on temperature change in one direction and to snap back to said first position on temperature change in the other direction, and means operative only when said device is at such temperature that it tends to snap to one of said positions for periodically urging said device to said second position.

16. A thermostatic control comprising an inherently snap-acting temperature-responsive device adapted to snap from a first position to a second position on temperature change in one direction and to snap back to said first position on temperature change in the other direction, and a thermal motor for periodically urging said device to one of said positions.

17. A thermostatic control comprising an inherently snap-acting temperature-responsive device adapted to snap from a first position to a second position on temperature change in one direction and to snap back to said first position on temperature change in the other direction, and a thermal motor for periodically urging said device to one of said positions, said thermal motor including a heating element adapted to be energized when said device is in said one position.

18. A thermostatic control comprising an inherently snap-acting temperature-responsive device adapted to snap from a first position to a second position on temperature change in one direction and to snap back to said first position on temperature change in the other direction, a thermal motor for periodically urging said device to one of said positions, said thermal motor comprising snap-acting thermostatic means adapted to snap to one position wherein it urges said device to its said one position upon cooling and to snap to a second position wherein it releases said device upon heating, and a heating element adapted to be energized when said device is in its said one position.

19. A thermostatic control comprising a dished snap-acting thermostatic disc adapted to snap from a first configuration to another upon change in temperature thereof above a predetermined limit and to snap back to its first configuration upon change in temperature below a lower predetermined limit, and a thermal motor for periodically urging said disc into its first configuration.

20. A thermostatic control comprising a dished snap-acting thermostatic disc adapted to snap from a first configuration to another upon change in temperature thereof above a predetermined limit and to snap back to its first configuration upon change in temperature below a lower predetermined limit, and a thermal motor for periodically urging said disc into its first configuration, said thermal motor including a heating element adapted to be energized when said disc is in its first configuration.

21. A thermostatic control comprising a dished snap-acting thermostatic disc adapted to snap from a first configuration to another upon change in temperature thereof above a predetermined limit and to snap back to its first configuration upon change in temperature below a lower predetermined limit, a thermal motor for periodically urging said disc into its first configuration, said thermal motor comprising snap-acting thermostatic means adapted to snap to one position wherein it urges said disc into its first configuration upon cooling and to snap to a second position wherein it releases said disc upon heating, and a heating element adapted to be energized when said disc is in its first configuration.

22. A thermostatic control for apparatus adapted to maintain a predetermined temperature in a medium comprising a circuit for said apparatus, a control circuit, normally open contacts in said control circuit adapted to make and break said circuit, an inherently snap-acting thermostatic disc responsive to temperature of said medium adapted to snap from a first configuration wherein it maintains said contacts closed to a second configuration wherein it permits said contacts to open upon change in temperature above a predetermined limit and to snap back to its first configuration upon change in temperature below a lower predetermined limit, a thermal motor comprising snap-acting thermostatic means adapted to snap to one position wherein it urges said disc into its first configuration upon cooling and to snap to a second position wherein it releases said disc upon heating, a heating element for said thermal motor adapted to be energized upon closure of said contacts, a time-delay switch in said apparatus circuit responsive to closure of said contacts for preventing completion of said apparatus circuit except when said contacts are closed for a substantial time, said time-delay switch comprising normally open contacts in said apparatus circuit, an inherently snap-acting thermostatic means adapted to snap to one position to close said contacts upon heating and to snap to a second position to open said contacts upon cooling, and a heating element therefor adapted to be energized upon closure of said first-mentioned contacts, the thermostatic means of said thermal motor being adapted to heat to snapping temperature faster than the thermostatic means of said time-delay switch and to cool more slowly.

VICTOR G. VAUGHAN.

REFERENCES CITED

The following references are of record in the file of this patent:

UNITED STATES PATENTS

| Number | Name | Date |
| --- | --- | --- |
| 1,885,053 | Slough | Oct. 25, 1932 |
| 2,246,186 | Prince | June 17, 1941 |
| 2,275,928 | Topham | Mar. 19, 1942 |
| 2,348,497 | Ray | May 9, 1944 |
| 2,350,938 | Sparrow | June 6, 1944 |
| 2,375,229 | Klemperer | May 8, 1945 |
| 2,399,901 | Wald | May 7, 1946 |